United States Patent
Reppe

(10) Patent No.: US 7,768,459 B2
(45) Date of Patent: Aug. 3, 2010

(54) TRANSPONDER CARD

(75) Inventor: Thomas Reppe, Dresden (DE)

(73) Assignee: KSW Microtec AG, Dresden (DE)

( * ) Notice: Subject to any disclaimer, the term of this patent is extended or adjusted under 35 U.S.C. 154(b) by 248 days.

(21) Appl. No.: 12/128,043

(22) Filed: May 28, 2008

(65) Prior Publication Data

US 2009/0021431 A1   Jan. 22, 2009

(30) Foreign Application Priority Data

Jun. 15, 2007   (DE) .................. 10 2007 028 357

(51) Int. Cl.
*H01Q 1/38* (2006.01)
(52) U.S. Cl. .............................. 343/700 MS
(58) Field of Classification Search .......... 343/700 MS, 343/702, 741, 866, 895; 340/572.1, 572.7, 340/572.8
See application file for complete search history.

(56) References Cited

U.S. PATENT DOCUMENTS

| | | | | |
|---|---|---|---|---|
| 5,574,470 A | * | 11/1996 | de Vall | 343/895 |
| 5,608,417 A | * | 3/1997 | de Vall | 343/895 |
| 7,546,671 B2 | * | 6/2009 | Finn | 29/592.1 |
| 2007/0171074 A1 | * | 7/2007 | Camp et al. | 340/572.7 |

FOREIGN PATENT DOCUMENTS

| | | |
|---|---|---|
| DE | 69927342 T2 | 6/2006 |
| DE | 10 2005 002 728 A1 | 8/2006 |
| EP | 1544786 A1 | 6/2006 |

* cited by examiner

*Primary Examiner*—Hoang V Nguyen
(74) *Attorney, Agent, or Firm*—Heslin, Rothenberg, Farley & Mesiti P.C.

(57) ABSTRACT

A transponder card comprises a carrier substrate arranged without interlayers between two protective plastic plates, a planar frame antenna, on the substrate with two supply connections and a conductor track connecting the supply connections, and an integrated circuit with two antenna connections. The antenna connections are electrically connected to the two supply connections and the integrated circuit is arranged such that the conductor track does not run through between the antenna connections. The conductor track may include at least two first conductor track segments and at least one second conductor track segment. Each end of the second conductor track segment is electrically connected to a respective first conductor track segment. The second conductor track segment crosses at least one of the two first conductor track segments at least once and is electrically insulated from the first conductor track segment by at least one nonconductive separation element.

16 Claims, 2 Drawing Sheets

TRANSPONDER CARD

BACKGROUND ART

Figure 1:
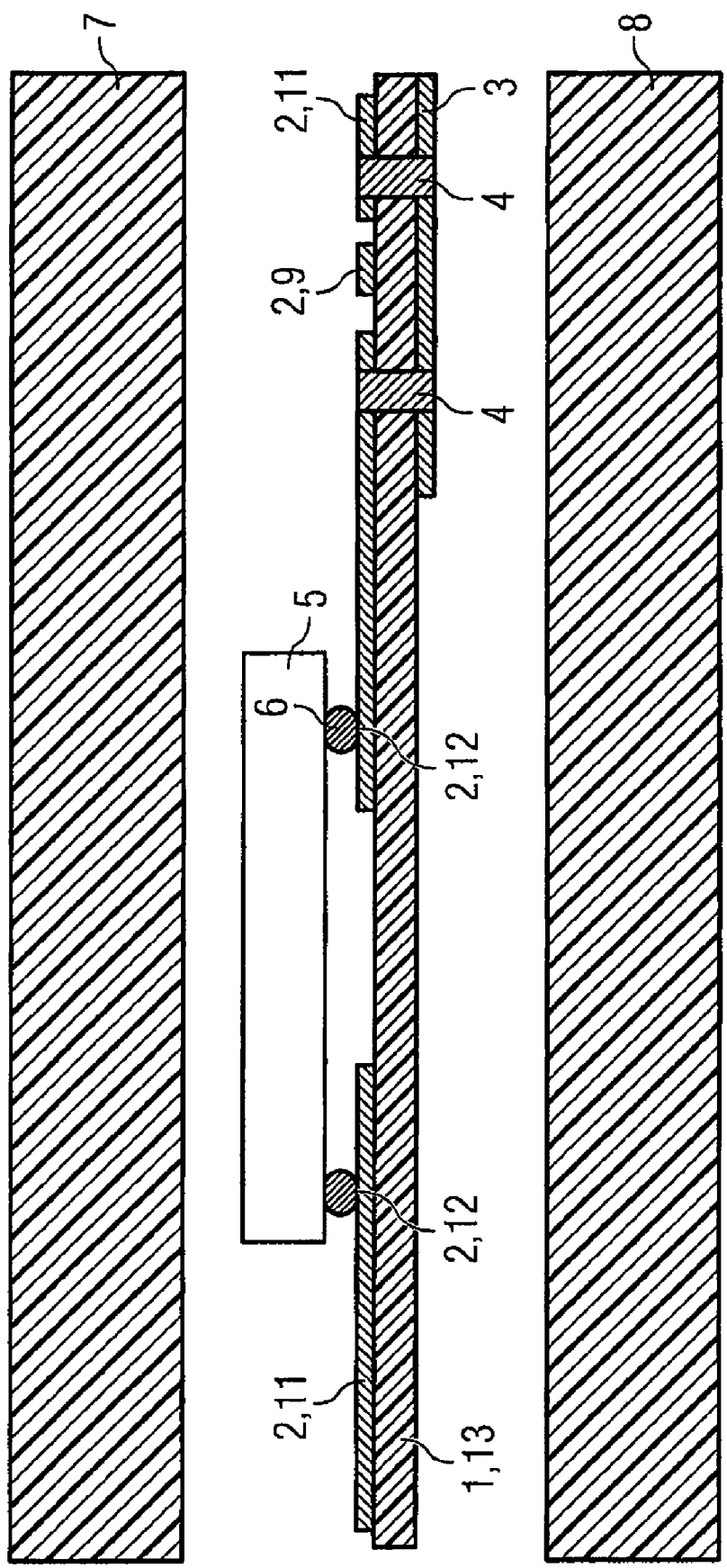

A description is given below of technical configurations of transponder cards which can be used for example as credit cards, check cards, identity cards or in other areas of application. In particular with regard to the dimensions and the mechanical properties, the transponder cards can in this case correspond for example to the provisions of ISO 7810, but no magnetic stripe or chip with which contact can be made externally has to be provided.

BRIEF SUMMARY OF INVENTION

The transponder card generally comprises two identically sized, planar protective plates composed of plastic, for example polyvinyl chloride (PVC), polycarbonate (PC), polyethylene terephthalate (PET) or polyethylene (PE), which are connected to one another. Said protective plates can for example homogeneously comprise a single layer or ply and a single material, but can also be constructed from a plurality of layers or plies composed of a single material and/or composed of a plurality of materials in a known manner, wherein for example a printed film layer is arranged below a transparently clear film laminated with high gloss. Moreover, it is possible to provide further features such as, for example, signature fields, data fields, passport photograph, bar code, hologram embossing, relief embossing, printing by hot embossing, or some other printing. In this case, the term "protective plate" is to be understood such that the carrier substrate described below is protected by the two protective plates, which envelop the carrier substrate, against both unfavorable climatic and also mechanical influences, for example excessive bending stress. In other words, the protective plates therefore have a significantly higher stiffness than the carrier substrate, with the result that the transponder card can be kept without problems in a wallet or pants pocket, without thereby being damaged.

A carrier substrate is arranged between the two protective plates without further interlayers, said carrier substrate carrying a transponder device, i.e. a communication, indicating and/or monitoring device for receiving and/or transmitting electromagnetic waves, for example radiofrequency waves. A particular feature of the transponder card is that it has no further interlayers besides the two protective plates and the carrier substrate. Therefore, its production is associated with a comparatively low outlay and is thus cost-effective.

In this context, the interlayers that are not used in the described transponder cards in contrast to known transponder cards are taken to mean sheetlike solid bodies, for example films, papers etc., which have hitherto usually been inserted into the construction of such transponder cards and have thus caused relatively high production costs. By contrast, the interlayers in this context are expressly not taken to mean layers composed of adhesion promoters, adhesives etc. It goes without saying that such layers, which are usually applied in pasty form and then cured, can be applied between the carrier substrate and the protective plates without departing from the subject matter of the described transponder cards.

Such a transponder device comprises for example a planar frame antenna (occasionally also referred to as a planar coil antenna), i.e. a coil antenna whose turns lie in one plane, and also an integrated circuit electrically connected to the frame antenna. A planar frame antenna is suitable particularly for operation in the short-wave range (RF range of approximately 3 to approximately 30 MHz), for example at a frequency of 13.56 MHz. The frame antenna can be implemented for example by selective application of electrically conductive material to the carrier substrate, wherein selective application is intended to mean that conductive material corresponding to the desired antenna structure is applied. In one configuration, the planar frame antenna is produced in a printing method in which conductor tracks composed of silver conductive paste, for example, are applied to the carrier substrate.

However, the frame antenna can also be implemented by selective removal of electrically conductive material from a conductive layer provided on the carrier substrate, wherein selective removal is intended to mean that conductive material is removed from the surface of the carrier substrate in such a way that the desired antenna structure is formed by the remaining parts of the conductive layer. In exemplary configurations, the frame antenna is produced by wet-chemical etching or dry etching (also referred to as plasma etching or ion etching).

The integrated circuit can be equipped with various functions. Examples of such functions are the modulation of electrical signals, the measurement and/or storage of data, the generation of a time signal etc. In one configuration, the integrated circuit is produced in a printing method. In so-called polymer electronics, electronic components are produced in a printing method from an organic semiconductor, for example semiconductor polymers such as polypyrrole, polyaniline, polyphenylenevinylene, polyfluorene or polythiophene and insulators. The latter can likewise comprise polymers and be printed in liquid form.

In one configuration, the antenna connections of the integrated circuit are electrically connected to the two supply connections of the frame antenna and the integrated circuit is arranged relative to the frame antenna such that the conductor track of the frame antenna, said conductor track extending between the two supply connections, does not run through between the antenna connections of the integrated circuit.

In this way, in the described transponder card, account is taken of advancing miniaturization in microelectronics, which leads to a continual reduction of the distance between the antenna connections of the integrated circuit. While it has hitherto still been possible in a manner relatively without problems to arrange semiconductor chips with the integrated circuit such that one antenna connection of the chip has been connected to the innermost turn and the other antenna connection of the chip has been connected to the outermost turn of the frame antenna, this will become more and more difficult in the future on account of ever smaller chip dimensions. One solution to the problem consists in arranging the integrated circuit relative to the frame antenna such that the conductor track of the frame antenna does not run through between the antenna connections.

In the described transponder card it may be provided, for example, that the conductor track of the frame antenna has at least two first conductor track segments and at least one second conductor track segment, wherein each end of the second conductor track segment is electrically connected to a respective first conductor track segment, the second conductor track segment crosses at least one of the two first conductor track segments at least once and is electrically insulated from the first conductor track segment by at least one nonconductive separation element at least in the crossover region.

In this case, the separation element can be formed for example by the carrier substrate and/or by an additional nonconductive layer. By way of example, it may be provided that the first conductor track segments are arranged on a first side of the carrier substrate and the second conductor track segment or segments is or are arranged on a second side of the carrier substrate opposite the first side, such that the carrier substrate electrically insulates the first and second conductor track segments.

It may also be provided that at least one first conductor track segment is covered with a nonconductive layer at least in regions and a second conductor track segment is subsequently arranged on the nonconductive layer and the two ends of the second conductor track segment are electrically connected to a respective first conductor track segment, such that the separation element is formed by the additional nonconductive layer. The nonconductive layer can be produced in a printing method, for example. In this configuration it may be provided that the first conductor track segments and the second conductor track segment or segments are arranged on the same side of the carrier substrate. The second conductor track segment can also be produced in a printing method, irrespective of the way in which the first conductor track segments were produced.

The carrier substrate is generally produced from a nonconductive material, such as plastic, for example. By way of example, the carrier substrate may be a film composed of polyvinyl chloride (PVC), polycarbonate (PC), polyethylene terephthalate (PET) or polyethylene (PE). In one configuration, the carrier substrate is a fibrous material, for example paper. If the planar frame antenna is produced by selective removal of conductive material, then it is possible to use for example a carrier substrate in which a conductive layer was adhesively bonded onto one or both sides of the carrier substrate with the aid of an adhesive layer. If the conductive material that is not required is subsequently removed (for example by wet-chemical etching) in such a way that the adhesive layer is not attacked in the process, then the latter can subsequently serve for connecting the carrier substrate to the outer protective plates.

BRIEF DESCRIPTION OF DRAWING FIGURES

Figure 2:
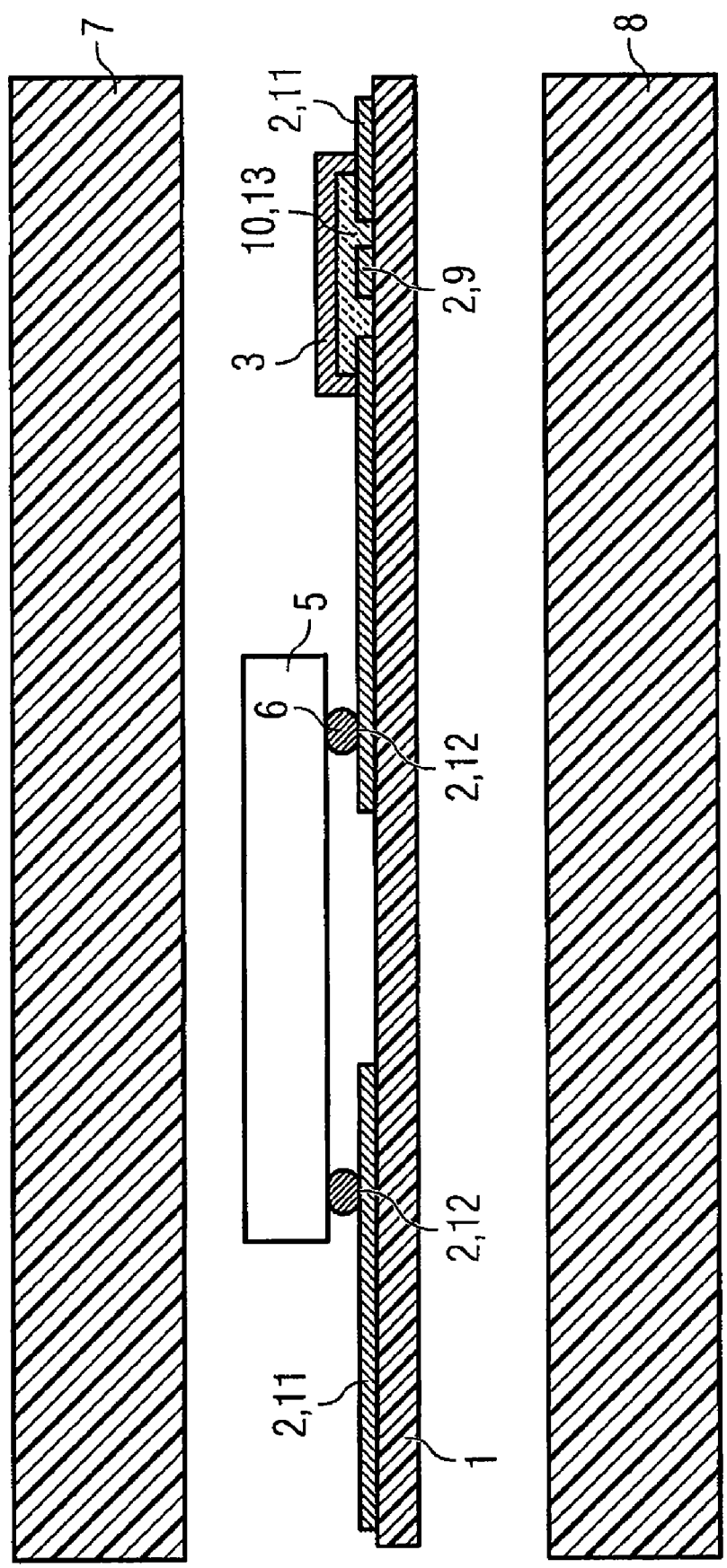

Exemplary configurations of the transponder card are explained in more detail below with reference to drawings, in which FIG. 1 shows a first exemplary embodiment, and FIG. 2 shows a second exemplary embodiment.

DETAILED DESCRIPTION

In the exemplary embodiment illustrated in FIG. 1, the carrier substrate 1 is arranged between the upper protective plate 7 and the lower protective plate 8 of the transponder card, a transponder device being situated on said carrier substrate. The transponder device comprises an integrated circuit 5 with antenna connections 6, and also a planar frame antenna 11 with supply connections 12, said frame antenna being constructed from first conductor track segments 2 and second conductor track segments 3. The integrated circuit 5 is connected to the supply connections 12 of the frame antenna 11 by the antenna connections 6.

In this exemplary embodiment, two first conductor track segments 2 are arranged on a first side of the carrier substrate 1 and the second conductor track segment 3 is arranged on the second side of the carrier substrate 1 opposite the first side. Each first conductor track segment 2 has a supply connection 12, to which an antenna connection 6 of the integrated circuit 5 is electrically connected, i.e. the semiconductor chip 5 used in the exemplary embodiment is directly connected to the frame antenna 11 using flip-chip technology. In this case, the chip 5 is arranged to the side away from the frame antenna 11 such that no conductor tracks 2, 3 associated with the frame antenna 11 have to be led through between the antenna connections 6.

For this purpose, the two first conductor track segments 2 are connected with the aid of a second conductor track segment 3, each of whose ends are in electrical contact with one of the two first conductor track segments 2, to form a single conductor track extending between the two supply connections. In this case, the second conductor track segment 3 is electrically insulated by a separation element 13 from that region 9 of the first conductor track segment 2 which the second conductor track segment 3 has to cross in order to be able to produce the connection between the two first conductor track segments 2.

In the exemplary embodiment illustrated, the separation element 13, which electrically insulates the first conductor track segments 2 from the second conductor track segment 3, is formed by the carrier substrate 1 since the first conductor track segments 2 and the second conductor track segment 3 are arranged on different sides of the carrier substrate 1. The electrical contact between the ends of the second conductor track segment 3 and the two first conductor track segments 2 is produced through the carrier substrate 1. This can be realized for example mechanically by the assemblage of carrier substrate 1 and the conductor track segments 2, 3 being crimped at the desired contact locations, for example by means of a tool having an uneven surface, such that parts of the conductive material of the first conductor track segment 2 come into contact with parts of the conductive material of the second conductor track segment 3.

In the exemplary embodiment illustrated, the electrical connection between the first conductor track segment 2 and the second conductor track segment 3 was realized with the aid of a plated-through hole 4, in which a hole previously introduced into the carrier substrate 1 at the location of the desired connection between first conductor track segment 2 and second conductor track segment 3 was filled with conductive material. This can be done for example galvanically, i.e. by deposition in an electrolyte, or chemically or in a printing method using conductive paste.

In the exemplary embodiment illustrated in FIG. 2, two first conductor track segments 2 and one second conductor track segment 3 are arranged on the same side of the carrier substrate 1. Each first conductor track segment 2 has a supply connection 12, to which an antenna connection 6 of the integrated circuit 5 is electrically connected, i.e. the semiconductor chip 5 used in the exemplary embodiment is directly connected to the frame antenna 11 using flip-chip technology. In this case, the chip 5 is arranged to the side away from the frame antenna 11 such that no conductor tracks 2, 3 associated with the frame antenna 11 have to be led through between the antenna connections 6.

For this purpose, the two first conductor track segments 2 are connected with the aid of a second conductor track segment 3, each of whose ends are in electrical contact with one of the two first conductor track segments 2, to form a single conductor track extending between the two supply connections. In this case, the second conductor track segment 3 is electrically insulated by a separation element 13 from that region 9 of the first conductor track segment 2 which the second conductor track segment 3 has to cross in order to be able to produce the connection between the two first conductor track segments 2.

In the exemplary embodiment illustrated, the separation element 13, which electrically insulates the first conductor track segments 2 from the second conductor track segment 3, is formed by the additional nonconductive, i.e. electrically insulating layer 10 since the first conductor track segments 2 and the second conductor track segment 3 are arranged on the same side of the carrier substrate 1. The electrical contact between the ends of the second conductor track segment 3 and the two first conductor track segments 2 is produced directly, i.e. the second conductor track segment 3 is arranged above the separation element 13, which, for its part, is arranged above the first conductor track segment 2. This can be realized for example by printing the separation element 13, that is to say the nonconductive layer 10, and the second conductor track segment successively onto the first conductor track segments 2.

What is claimed is:

1. A transponder card, comprising a carrier substrate arranged without interlayers between two protective plates composed of plastic, a planar frame antenna on the substrate with two supply connections and a conductor track connecting the supply connections, and an integrated circuit with two antenna connections, wherein the antenna connections are electrically connected to the two supply connections and the integrated circuit is arranged relative to the frame antenna such that the conductor track does not run through between the antenna connections of the integrated circuit.

2. The transponder card as claimed in claim 1, wherein the protective plates are fabricated from PVC.

3. The transponder card as claimed in claim 1, wherein the protective plates are fabricated from PC.

4. The transponder card as claimed in claim 1, wherein the carrier substrate is fabricated from the same plastic as the protective plates.

5. The transponder card as claimed in claim 1, wherein the carrier substrate is fabricated from PET.

6. The transponder card as claimed in claim 1, wherein the carrier substrate is fabricated from fibrous material.

7. The transponder card as claimed in claim 1, wherein the integrated circuit is a printed circuit.

8. The transponder card as claimed in claim 1, wherein the integrated circuit is a semiconductor chip, and the antenna connections are directly connected to the supply connections of the frame antenna.

9. The transponder card as claimed in claim 1, wherein the frame antenna is produced by selectively removing a conductive layer provided on the carrier substrate.

10. The transponder card as claimed in claim 9, wherein the frame antenna is fabricated in a wet-chemical etching method.

11. The transponder card as claimed in claim 10, wherein the frame antenna is fabricated in a metal deposition method.

12. The transponder card as claimed in claim 1, wherein the frame antenna is produced by selectively forming a conductive layer on the carrier substrate.

13. The transponder card as claimed in claim 12, wherein the frame antenna is fabricated in a printing method.

14. A transponder card, comprising a carrier substrate, arranged without interlayers between two protective plates composed of plastic, a planar frame antenna on the substrate with two supply connections and a conductor track connecting the supply connections, and an integrated circuit with two antenna connections, wherein the conductor track has at least two first conductor track segments and at least one second conductor track segment, wherein each end of the second conductor track segment is electrically connected to a respective first conductor track segment, the second conductor track segment crosses at least one of the two first conductor track segments at least once and is electrically insulated from the first conductor track segment by at least one nonconductive separation element at least in a crossover region.

15. The transponder card as claimed in claim 14, wherein the separation element is formed by the carrier substrate.

16. The transponder card as claimed in claim 14, wherein the separation element is formed by an additional nonconductive layer.

* * * * *